United States Patent [19]

Sortwell et al.

[11] Patent Number: 4,529,794
[45] Date of Patent: Jul. 16, 1985

[54] METHOD OF RAPIDLY DISSOLVING POLYMERS IN WATER

[75] Inventors: Edwin T. Sortwell, Wheaton; Manuel Slovinsky, Woodridge; Alan R. Mikkelsen, Downers Grove, all of Ill.

[73] Assignee: Diatec Polymers, Batavia, Ill.

[21] Appl. No.: 594,559

[22] Filed: Mar. 29, 1984

[51] Int. Cl.³ .............................................. C08C 1/00
[52] U.S. Cl. ..................................... 528/499; 528/502
[58] Field of Search ................................ 528/499, 502

[56] References Cited

U.S. PATENT DOCUMENTS

| Re. 28,474 | 7/1974 | Anderson et al. | 260/29.6 H |
| Re. 28,576 | 10/1975 | Anderson et al. | 260/29.6 H |
| 3,541,062 | 3/1967 | Van Dierendonck | 528/499 |
| 4,113,688 | 9/1978 | Pearson . | |

OTHER PUBLICATIONS

Comitrol® Catalog—Urschel Laboratories, Inc.—Bulletin No. 706—Mar. 1973.

Primary Examiner—John Kight
Assistant Examiner—M. L. Moore
Attorney, Agent, or Firm—Wood, Dalton, Phillips, Mason & Rowe

[57] ABSTRACT

A method for rapidly dissolving particles of dry water soluble polymers or gums in water. A suspension of polymer particles is formed and subjected to conditions of high shear in a particle size reduction apparatus whereby the finely divided particles are forced into solution. Sufficient water is present that heat is dissipated and molecular degradation of the polymer is avoided.

33 Claims, 5 Drawing Figures

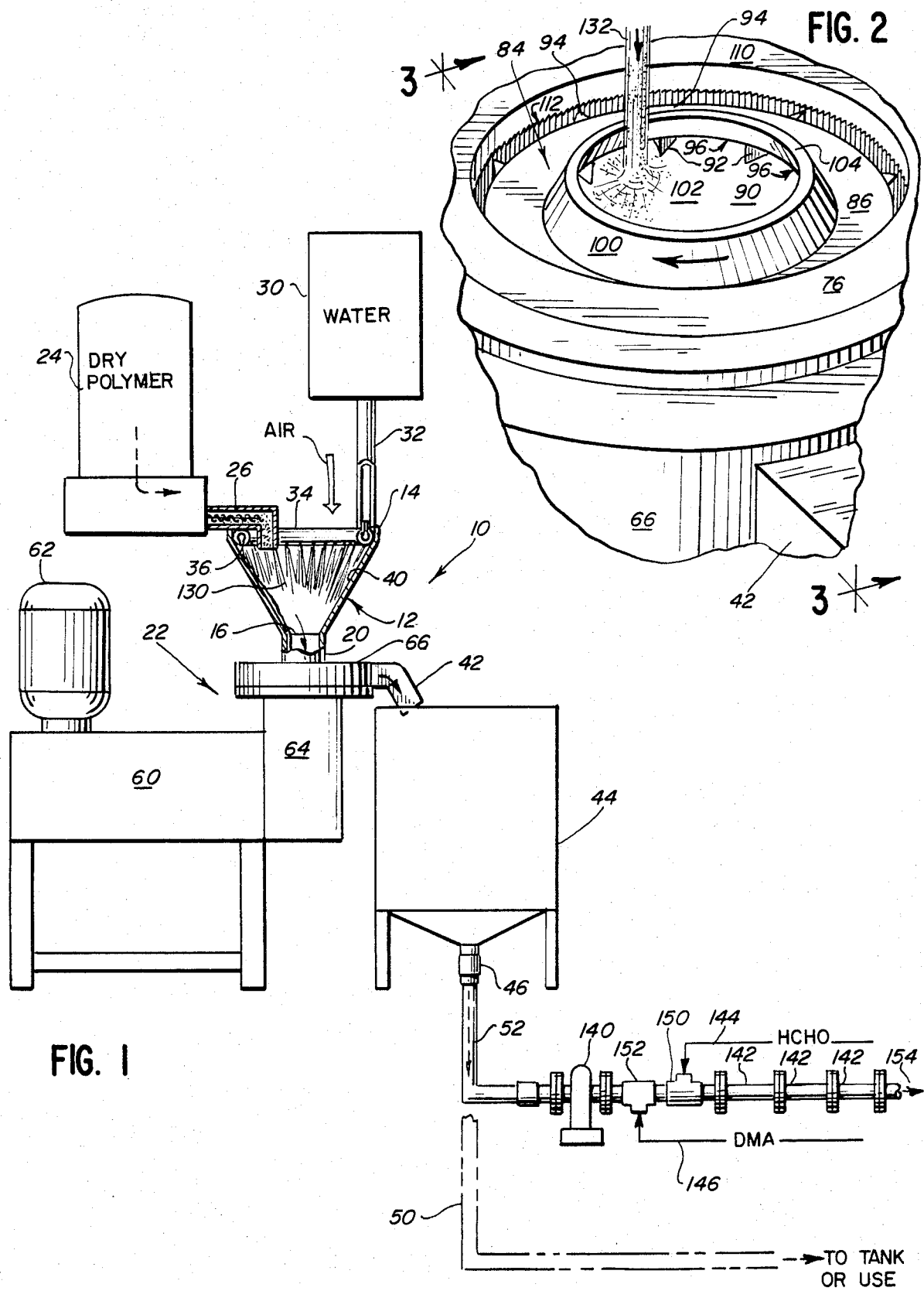

METHOD OF RAPIDLY DISSOLVING POLYMERS IN WATER

BACKGROUND OF THE INVENTION

1. Field of the Invention

This invention relates generally to the dissolution of polymers in water and, more particularly, this invention relates to a method and apparatus for rapidly dissolving dry, water soluble polymers in water.

2. Description of the Prior Art

The use of solutions of water soluble polymers in thickening and flocculating applications is well known. Such applications include the clarification of aqueous solutions in mining, papermaking, and in treatment of sewage and industrial wastes. Such solutions of polymers are also useful as stabilizers for drilling muds, and in the secondary recovery of petroleum by water flooding.

Although these polymers are most often available commercially as powders or as finely divided solids, they are most frequently utilized in aqueous solutions. This necessitates that the solid polymer be dissolved in water. Although the various polymers are more or less soluble in water, difficulty is often experienced in preparing aqueous polymer solutions because of their slow rate of dissolution and because the solid polymer is not readily dispersible in water.

Furthermore, dissolution of solid polymers in water is hindered by the tendency of polymer particles to clump or remain as agglomerates on contact with water. Lumps of solid polymer immediately form after limited wetting with water by the encapsulation of undissolved solids in an outer coating of water-wet polymer which retards the penetration of additional water into the agglomerate. Although many of these lumps are eventually dissolved by continued agitation, it is frequently impractical to agitate the solution for a sufficiently long period to obtain complete dissolution. Long mixing times, of course, are uneconomical and may damage the molecular weight of already dissolved polymer through exposure of the polymer to excessive hydraulic and mechanical shear.

The problem is compounded by the fact that dry polymer particles usually include very fine, dustlike particles. This creates pollution problems in the vicinity of the equipment and can aggravate the problem of buildup of sticky or slippery polymer on equipment surfaces.

Some of the foregoing problems are described in numerous prior publications, including U.S. Pat. No. Re. 28,474 (July 8, 1974) and U.S. Pat No. Re. 28,576 (Oct. 21, 1975) issued to Anderson et al.

The above-identified Anderson et al reissue patents exemplify prior approaches to overcoming the problem of rapidly dissolving polymers in the water. In the Anderson et al disclosures, water soluble polymer is dispersed into a water-in-oil emulsion, which emulsion is then inverted in water to release the polymer into solution.

The method of the Anderson et al disclosures is limited in terms of the polymer content of the emulsion. Further, such systems, in practice, require substantial amounts of an emulsifier to provide a stable product and, of course, require the use of an oil phase, which creates handling and economic problems.

Other prior methods do not rely on inversion of a polymer dispersion from an emulsion, but utilize simple mixing of polymers with water. This requires long mixing times which, in turn, require mixing and storage facilities for large volumes of solution. As a result, long storage and/or mixing times are required between the time that dry polymer is initially mixed with water and the solution thereof can be used, and capital investment and energy costs are high.

SUMMARY OF THE INVENTION

It is an object of the invention to overcome one or more of the problems described above.

According to the present invention, particulate water soluble polymers or gums, or mixtures thereof, are very rapidly dissolved in water by a method which comprises the steps of forming a suspension of polymer particles with water and, simultaneously or immediately subsequent to the formation of the suspension, subjecting the suspension to instantaneous and momentary conditions of extremely high shear forces whereupon the polymer particles are finely divided and forced into solution.

The proportion of water to polymer and the conditions of shear are selected to avoid molecular degradation of the polymer.

The particle size reduction is carried out in an apparatus suitable for size reduction of particles which are suspended in a liquid. For example, a suitable apparatus comprises an impeller which is rotatable at a high rate of speed, with a cylindrical array of generally radially directed blades circumferentially surrounding the impeller, with outwardly directed discharge spaces defined between adjacent blades.

The mixture discharged from the apparatus is essentially a solution of polymer and water, but may contain some undissolved polymer which goes completely into solution within a short period, with or without further agitation.

The invention also contemplates an apparatus for carrying out the inventive method.

By means of the invention, a useful solution of polymer and water is very rapidly obtained without agglomeration of particles, dusting of polymer into the immediate environment of the process equipment, or build up of sticky or slippery polymer on equipment surfaces. Any dust which may be present is educted into the solution. The need for an inversion process, large mixing tanks or long mixing times is eliminated.

The solution can be transferred to tanks for storage, used virtually immediately or, alternatively, used in chemical reactions with other reactants.

Further objects and advantages of the invention will be apparent to those skilled in the art from the following detailed description, taken in conjunction with the drawings and the appended claims.

BRIEF DESCRIPTION OF THE DRAWINGS

FIG. 1 is a partially schematic view, taken partially in section, of an apparatus suitable for carrying out the method of the invention;

FIG. 2 is a perspective view of a portion of the apparatus of FIG. 1, with some elements omitted for clarity;

DETAILED DESCRIPTION OF THE INVENTION

The Water Soluble Polymers

Figure 3:
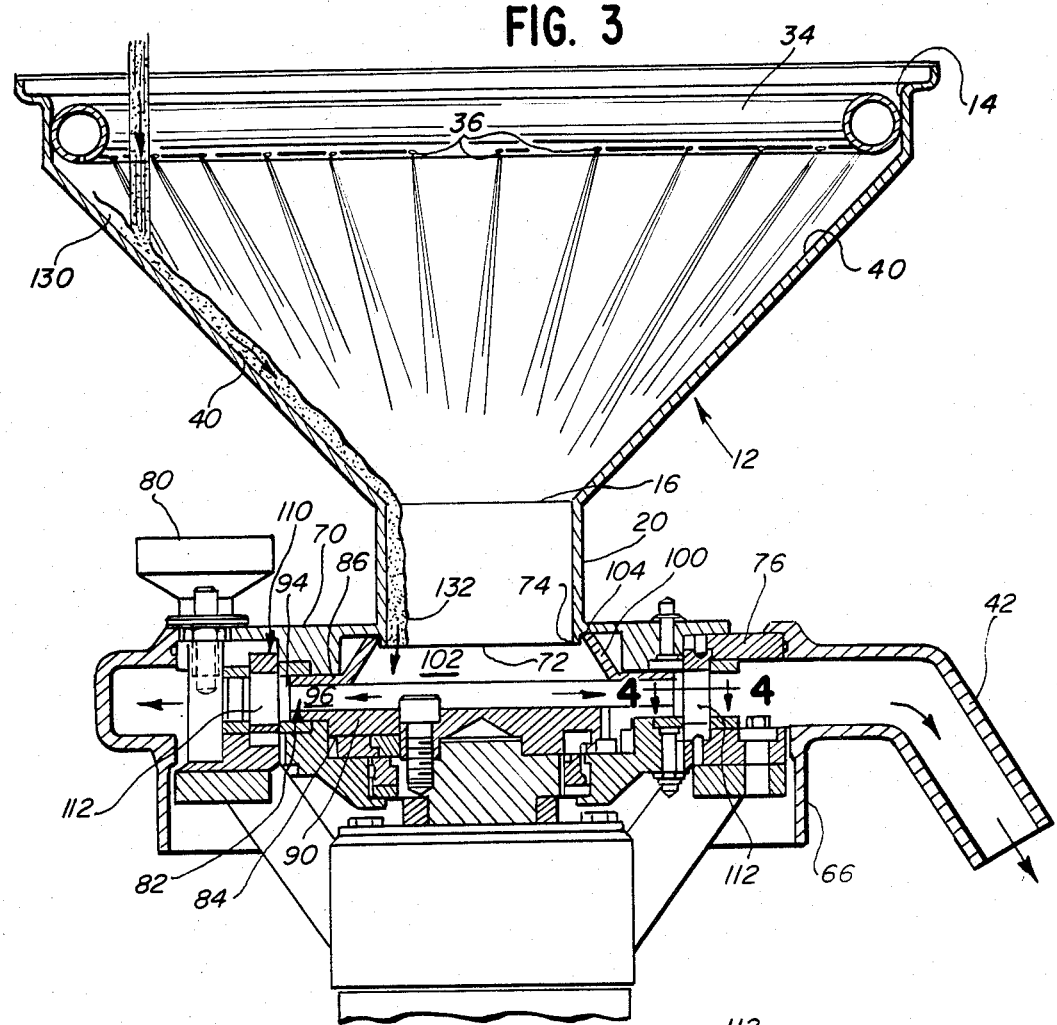
FIG. 3 is a sectional elevation of the apparatus of FIGS. 1 and 2 taken generally along line 3—3 of FIG. 2.

The polymers which may be dissolved according to the invention are well known in the art and have been described in numerous publications and patents. They include, but are not limited to, naturally occurring galactomannan gums such as guar and locust bean gums, alginate salts, biologically produced polymers (e.g. Xanthan gum), polyethylene oxides, water soluble condensation polymers, and vinyl addition polymers such as polyacrylamides and copolymeric derivatives of acrylamide with, for example, acrylic acid, maleic anhydride, acrylonitrile, styrene, allyl or diallyl amines or dimethylaminoethylmethacrylate (DMAEM). Such polymers may be nonionic, anionic or cationic.

The gums are well-known water-soluble polymers, and include those described in Volume 10 of the Encyclopedia of Chemical Technology, 2nd Edition, Interscience Publishers, 1966, the disclosure of which is incorporated herein by reference.

The molecular weight of the polymers may vary over a wide range, e.g. between about 10,000 and 25,000,000, and molecular weight is not a critical parameter in this invention. The invention is particularly useful with respect to acrylamide polymers, the molecular weights of which are generally in excess of 1 million.

As used herein, the term "polymer" is understood to include polymers and gums which are soluble in water to a significant degree. The polymers are solid, but may have a substantial water content.

While the particle size of the polymer is not critical, the particles will generally be less than about ⅛" in diameter and may include fine particles of less than 200 mesh (Tyler).

The Dissolution Method and Apparatus

Referring now to the drawings, the method of the invention and a preferred embodiment of an apparatus suitable for carrying out the method will be described.

FIG. 1 illustrates an apparatus, generally designated 10, comprising a vertical frustoconical solid/water contacting means, generally designated as funnel 12, which may be open at its larger upper end 14. The frustum 16 of the funnel 12 defines an outlet communicating via a cylindrical conduit 20 with a particle size reduction apparatus, generally designated 22, and described in more detail below. A source of dry polymer particles, such as a hopper 24, supplies polymer to feeding means, such as an auger 26, for example, which feeds the polymer particles to the interior of the funnel 12.

A source of water 30 supplies water through a conduit 32 to water distribution means, such as the illustrated annular conduit 34 which is disposed within the upper end 14 of the funnel 12. The conduit 34 is provided with a plurality of discharge holes 36 on the lower side thereof for discharging water to the inner conical surface 40 of the funnel 12.

Pumps, valves, etc. associated with the respective sources of polymer and water are omitted for clarity.

The particle size reduction apparatus 22 discharges polymer solution through an outlet 42 to a holding tank 44 with a discharge outlet 46 at the bottom thereof. If desired, the tank 44 may be equipped with a mixer (not shown) to assist in dissolution of polymer and the removal of entrained air from the solution.

As described in more detail below, polymer solution may be removed from the tank 44 through the outlet 46 through a line 50, shown in dotted lines, directly to a holding tank or for immediate use. Alternatively, the solution may be removed from the tank 44 through the outlet 46 and a line 52 for immediate chemical reaction, as described below.

As seen in FIG. 1, the particle size reduction apparatus 22 generally comprises a main housing 60 supporting a motor 62, an impeller shaft housing 64, and an impeller housing 66.

Referring now to FIGS. 2 and 3, the interior of the impeller housing 66 will be described in more detail.

As best seen in FIG. 3, the outlet conduit 20 of the funnel 12 includes a radial flange 70 which extends outwardly from the conduit 20 at a point slightly above the bottom edge 72 of the conduit 20 so as to define a circumferential lip 74 thereon. The outer periphery of the flange 70 rests upon and is supported by an annular raised surface 76 on the housing 66. The funnel 12 is secured to the housing 66 by hold-down assemblies 80.

Mounted for rotation within a cavity 82 in the housing 66 is an impeller, generally designated 84, which comprises an open cover plate 86, a bottom plate 90, and a plurality of upstanding guide vanes 92 disposed between the cover plate 86 and the bottom plate 90. Each guide vane terminates at its radially outermost end in a cutting tip 94. Adjacent guide vanes define a plurality of radical discharge openings 96.

The cover plate 86 includes an inverted frustoconical wall 100 which defines a central opening 102. The flange 70 of the funnel 12 rests upon an upper edge 104 of the wall 100, with the funnel lip 74 extending into the central opening 102.

The impeller 84 is driven for high speed (e.g. up to 13,000 rpm) rotation by the motor 62 through a drive train (not shown) in the housing 60.

Figure 4:
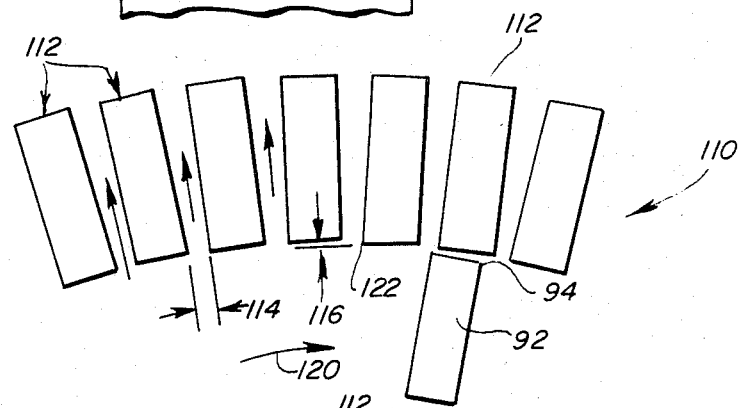
FIG. 4 is a sectional view of the apparatus of FIG. 3 taken generally along line 4—4 of FIG. 3; and, FIG. 5 is a modified embodiment of the apparatus of FIG. 4.
Figure 5:
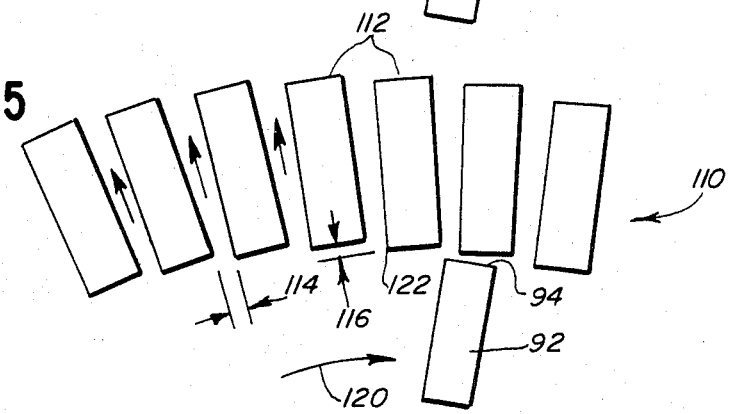

The impeller 84 is surrounded about its circumference by a cylindrical array 110 of cutting blades 112. As best seen in FIGS. 4 and 5, the blades 112 are fixed so as to define openings 114 therebetween of substantially uniform size. A gap 116 defined between the impeller cutting tips 94 and the blades 112 determine the so-called "depth of cut" of the apparatus.

As seen in FIGS. 4 and 5, the impeller 84 rotates in the direction of the arrow 120, and the leading edges 122 of the blades 112 define cutting edges for finely dividing particulate matter. As material is reduced in size, it is discharged radially outwardly through the openings 114.

The respective blade arrays 110 of FIGS. 4 and 5 differ from each other in terms of the angle of the blades 112 with respect to the vanes 92. The blades 112 of FIG. 4 are generally radially aligned with the vanes 92, while those of FIG. 5 are disposed at an angle of about 2° from the vanes 92. As is known in the art, variation of the angle of the blades 112 varies the depth of cut 116, with the depth of cut 116 increasing as the angle between the vanes and the blades increases. A blade/vane angle of 2° is suitable.

The apparatus 22 of the drawings is a commercially available apparatus marketed by Urschel Laboratories, Inc. of Valparaiso, Ind. under the trademark Comitrol® Model 1500. This apparatus is used in the food processing industry for extremely fine size reduction or emulsification of such foods as peanuts (i.e. peanut butter production) or vegetables. The Urschel Comitrol® 1500 blade array 110 has an internal diameter of about 8" with a variety of available blade arrays having between 50 and 222 blades per array. In the invention, an array having 200 blades is preferred with openings 114 of 0.0103 inches and a gap 116 of 0.0048 inches.

The apparatus 22 of the drawings is a preferred apparatus for carrying out the method of the invention, although the selection of particular components of the apparatus is not critical as a variety of different types of size reduction equipment are suitable. The functions of the various elements of the apparatus will be apparent to those skilled in the art from the following description of the inventive method with reference to the drawings.

In accordance with the invention, the apparatus 22 accomplishes dissolution of dry polymer particles in water. As is well known in the art, usable concentration of polymers in water is a function of the type of polymer, the molecular weight of the polymer, the temperature etc. With acrylamide polymers, for example, aqueous solutions comprising between about 0.05 and 6 weight percent of polymer in water are useful for various applications.

The inventive method allows virtually instantaneous dissolution of the polymer into water, and the respective feed rates of polymer and water to the apparatus 22 are selected according to the desired polymer concentration in the solution. In the apparatus of the drawings, for example, a water feed rate of about 30 gal/min is typical, with the feed rate of polymer chosen to provide a total weight flow rate of polymer and water wherein the polymer comprises a selected percentage within the range of about 0.05 and 6 weight percent.

In accordance with the invention, water is supplied from the source 30 to the discharge conduit 34 at a selected rate. The water discharged from the holes 36 defines a stream or film 130 on the funnel surface 40. Dry polymer particles, generally of a size range of ⅛" to less than 200 mesh (Tyler) are fed from the polymer source 24 to the funnel surface 40 where they contact the water stream or film 130. In the embodiment of the drawings, the polymer is discharged to a point above and off-center of the funnel frustum 16 to assure good mixing of the polymer with the water in the funnel. It should be noted that the water flow in the figures is downwardly directed, without a rotational swirl, but it is not critical that water flow be free of such a swirl.

Alternatively, if desired, the polymer inlet may be positioned over center of the frustum 16 so that polymer first contacts the water in the opening 102 of the impeller 84.

The pumping action of the impeller 84 creates an eductive effect which draws air from the environment into the funnel, thereby entraining any polymer dust which may be present. This has the effect of keeping the immediate environment of the apparatus free of dust and maximizes the amount of polymer entrained in the water.

Upon contact, the polymer and water form a suspension of polymer particles entrained in the water.

As schematically illustrated in FIG. 2, the suspension, generally designated 132, is discharged from the conduit 20 directly into the impeller 84. The impeller 84 rotates at an extremely high rate (e.g., 10,000 to 13,000 rpm). As a result, the polymer suspension is immediately discharged radially outwardly through the discharge openings 96 to the gap 116 between the vanes 92 and the blades 112 where the polymer particles are subjected to instantaneous and momentary conditions of extremely high shear.

The extremely high shear conditions experienced by the polymer particles result in size reduction of the particles to extremely fine sizes. However, due to the fact that the particles are suspended in a relatively large volume of water, significant molecular degradation or loss of molecular weight of individual particles is not experienced, and this is critical for the success of the invention. It is believed that such degradation is avoided by heat dissipation in water.

It is important that the proportion of water to polymer, and the conditions of shear be selected so as to provide extremely fine size reduction without molecular degradation of the particles. As will be explained below, the presence of molecular degradation is readily ascertainable by comparing the viscosity of the resulting solution with that of a solution of identical concentration made by a conventional mixing method.

If an Urschel Comitrol® 1500 Model apparatus is used, selection of the number of blades and their angle thereof in the blade array 110 is important, and will depend upon the particular polymer, its particle size, the water and polymer flow rates, etc. Selection of the blade array is done empirically. The number of blades 112 in the array 110 must be sufficient to provide extremely fine size reduction, yet not so great as to result in openings 114 of such a small size that the opening will be plugged by reduced polymer particles.

Similarly, the angle between the cutting tips 92 and the blades 112 is chosen to provide optimum size reduction. If the angle is too small, plugging may occur as particles are not sufficiently reduced in size to pass through the openings 114. Other angles may reduce or eliminate plugging, yet result in molecular degradation of polymer or insufficient particle size reduction.

In the apparatus of the drawings, it has been found that optimum performance is attained with a 30 gal/min water flow rate, a 200 blade array, and an angle of 2° between the impeller tips and the blades. The use of a 160 blade array results in plugging-free operation, but the resulting polymer particles are too large to be dissolved rapidly. The use of a 212 blade array is believed to result in plugging and/or degradation.

With a 200 blade array and a 0° angle, plugging occurs. Plugging is eliminated with a 1° angle, but the polymer experiences molecular degradation.

Those skilled in the art will appreciate from the foregoing that selection of the size of machine, number of blades, and blade/impeller angle will depend on a number of variables, including water and polymer flow rates, the molecular weight of the polymer, the type of polymer, etc., and that such selection can be readily accomplished empirically.

The shearing conditions and consequent size reduction effectively forces the particles into aqueous solution as they are discharged from the impeller 84 and through the openings 114 in the blade array 110. From the openings 114 they are discharged through the outlet 42 to the tank 44.

According to the method described herein, a high proportion of the polymer particles introduced to the apparatus is dissolved in the water. Depending on the molecular weight of the polymer, the temperature, and the proportion of polymer to water, a small proportion of polymer may remain undissolved as it is discharged from the outlet 42. However, in almost all cases, gentle agitation of the resulting mixture or simply residence time will result in substantially complete dissolution within a short time, for example, 5 to 30 minutes. This represents a drastic improvement in dissolution time as compared to prior mixing methods.

As noted above, the solution in the tank 44 is ready for immediate end use and may be removed through the line 50 to a holding tank, a mixing tank for further agitation, or directly to the site of end use.

Alternatively, the solution in the tank 44 may be withdrawn immediately for use in a chemical reaction, such as the well-known Mannich reaction or, if the dissolved polymer is a nonionic polyacrylamide polymer, for example, for hydrolysis, as by reaction with caustic solution.

For example, the solution may be withdrawn from the tank 44 through the outlet 46 and the line 52 and pumped, as by a lobe pump 140, through a series of static in-line mixers 142. Chemical reactants, such as formaldehyde (HCHO) and dimethylamine (DMA) may be introduced into the line 52 through lines 144 and 146, respectively, which join the line 52 at T-unions 150 and 152. (The formaldehyde and DMA are metered through metering pumps (not shown) in lines 144 and 146.) The product is removed at 154 for direct use or further reaction.

The method of the invention is especially advantageous in producing aqueous polymer solutions for high volume usage such as in mining, papermaking, waste treatment or enhanced oil recovery operations where prior methods required large volume mixing and/or holding tanks. Further, the inventive method lends itself to oxygen exclusion during solution preparation, as would be required in enhanced oil recovery applications where oxidative polymer degradation is to be avoided. In this case, the solution is prepared with the exclusion of air from the system, and with a purge or blanket of inert gas provided to the apparatus.

EXAMPLE

The inventive method is illustrated by the following specific example, which is intended to be illustrative but not limiting.

A series of solutions of various acrylamide polymers were made according to the invention in an apparatus as shown in the drawings and, for comparison, by simple mixing in water with a laboratory stirrer. The viscosities of the respective solutions so obtained were measured and compared. (For any given polymer and concentration thereof, the molecular weight of dissolved polymer is a direct function of the viscosity.)

In the following example, Polymer 1 is an anionic polyacrylamide copolymer comprising 85 wt. % acrylamide and 15 wt. % 2-acrylamido-2-methyl propane sulfonic acid (AMPS). Polymer 2 is an anionic acryl amide copolymer comprising 63 wt. % acrylamide and and 37 wt. % sodium polyacrylate. Polymer 3 is a nonionic acrylamide homopolymer having an intrinsic viscosity (IV) of 6.

Polymer 4 is a nonionic high molecular weight acrylamide homopolymer having an intrinsic viscosity of 16. Polymers 5, 6 and 7 are nonionic acrylamide homopolymer having intrinsic viscosities of 10, 12 and 14, respectively.

The invention solutions were made utilizing an Urschel Comitrol ® Model 1500 mixing unit with a cutting head having 200 blades set at a 2° angle from the impeller, operating at 10,000 rpm.

The following Table gives the results of the comparative tests demonstrating the viscosity obtained with the solutions made according to the invention as compared to the viscosities of control solutions having identical polymer concentrations. The Table also gives the parameters of the Brookfield viscosity measurement.

TABLE

| Polymer | Concentration (wt. %) | Viscosity (cps) | Control Viscosity (cps) | Brookfield Viscosity Measurement | | |
|---|---|---|---|---|---|---|
| | | | | Spindle | RPM | Temp(°F.) |
| 1 | 0.289 | 190 | 150 | 3 | 60 | 68 |
| 2 | 0.3 | 286 | 232 | 3 | 60 | 68 |
| 3 | 0.5 | 10.9 | 11.5 | 1 | 60 | 68 |
| 4 | 0.5 | 330 | 380 | 1 | 6 | 67 |
| 5 | 0.5 | 39.0 | 39.2 | 1 | 60 | 66 |
| 6 | 0.5 | 137.8 | 139.4 | 1 | 30 | 66 |
| 7 | 0.5 | 186.8 | 192.8 | 1 | 30 | 66 |

It is readily apparent from the foregoing data that no significant decrease in viscosity is obtained by means of the invention. (In fact, some data show a surprising increase in viscosity.) This demonstrates that the method of the invention provides rapid dissolution of polymer without loss of molecular weight.

The foregoing detailed description is given for clearness of understanding only, and no unnecessary limitations are to be understood therefrom, as modifications within the scope of the invention will be obvious to those skilled in the art.

We claim:

1. A method of rapidly dissolving particles of a water soluble polymer in water, comprising the steps of:
   (a) contacting said particles with water to form a suspension of said particles in water; and,
   (b) simultaneously with or immediately after formation of said suspension subjecting said suspension to instantaneous and momentary conditions of high shear in order to finely divide said particles, said shear conditions and the proportion of said water to said polymer in said suspension being selected to avoid molecular degradation of said polymer, whereby at least a portion of said particles are dissolved in said water.

2. The method of claim 1 wherein said polymer comprises between about 0.05 weight percent and 6 weight percent, inclusive, of the total weight of said water and said polymer.

3. A method of rapidly dissolving particles of a water soluble polymer in water, comprising the steps of:
   (a) contacting said particles with water to form a suspension of said particles in water; and,
   (b) simultaneously with or immediately after formation of said suspension finely dividing said particles by subjecting said suspension to instantaneous and momentary conditions of high shear in a particle size reduction apparatus comprising a rotatable impeller and a cylindrical array of generally radially directed blade member circumferentially surrounding said impeller, with radial discharge spaces defined between adjacent blades, said shear conditions and the proportion of said water to said polymer in said suspension being selected to avoid molecular degradation of said polymer, whereby at least a portion of said particles are dissolved in said water.

4. The method of claim 3 wherein said discharge spaces are of substantially uniform width.

5. The method of claim 4 wherein said blades and said impeller are offset from each other by an angle of about 2°.

6. A method of rapidly dissolving particles of a water soluble polymer in water, comprising the steps of:
   (a) contacting said particles with water to form a suspension of said particles in water; and,
   (b) immediately after formation of said suspension subjecting said suspension to instantaneous and momentary conditions of high shear in order to finely divide said particles, said shear conditions and the proportion of said water to said polymer in said suspension being selected to avoid molecular degradation of said polymer, whereby at least a portion of said particles are dissolved in said water.

7. The method of claim 6 wherein said suspension is formed by contacting dry particles of said polymer with a stream of water in mixing means communicating with a particle size reduction apparatus.

8. The method of claim 7 wherein said mixing means comprises a source of polymer particles, a source of water, means for defining a stream of said water, and means for delivering said particles to said stream for mixing thereof.

9. A method of rapidly dissolving particles of a water soluble acrylamide polymer in water, comprising the steps of:
   (a) contacting said particles with water to form a suspension of said particles in water; and,
   (b) simultaneously with or immediately after formation of said suspension subjecting said suspension to instantaneous and momentary conditions of high shear in order to finely divide said particles, said shear conditions and the proportion of said water to said polymer in said suspension being selected to avoid molecular degradation of said polymer, whereby at least a portion of said particles are dissolved in said water.

10. The method of claim 9 wherein said acrylamide polymer comprises between about 0.05 weight percent and 6 weight percent, inclusive, of the total weight of said water and said polymer.

11. A method of rapidly dissolving particles of a water soluble acrylamide polymer in water, comprising the steps of:
   (a) contacting said particles with water to form a suspension of said particles in water; and,
   (b) simultaneously with or immediately after formation of said suspension finely dividing said particles by subjecting said suspension to instantaneous and momentary conditions of high shear in a particle size reduction apparatus comprising a rotatable impeller and a cylindrical array of generally radially directed blade members circumferentially surrounding said impeller, with radial discharge spaces defined between adjacent blades, said shear conditions and the proportion of said water to said polymer in said suspension being selected to avoid molecular degradation of said polymer, whereby at least a portion of said particles are dissolved in said water.

12. The method of claim 11 wherein said discharge spaces are of substantially uniform width.

13. The method of claim 12 wherein said blades and said impeller are offset from each other by an angle of about 2°.

14. The method of claim 9 wherein said suspension is formed prior to step (b).

15. The method of claim 14 wherein said suspension is formed by contacting dry particles of said polymer with a steam of water in mixing means communicating with a particle size reduction apparatus.

16. The method of claim 15 wherein said mixing means comprises a source of polymer particles, a source of water, means for defining a stream of said water, and means for delivering said particles to said stream for mixing thereof.

17. The method of claim 9 or 11 wherein said acrylamide polymer is a homopolymer.

18. The method of claim 9 or 11 wherein said acrylamide polymer is a copolymer derivative of acrylamide and a comonomer.

19. The method of claim 18 wherein said comonomer comprises 2-acrylamido-2-methyl propane sulfonic acid.

20. The method of claim 18 wherein said comonomer is selected from the group consisting of acrylic acid, maleic anhydride, acrylonitrile, styrene, allyl amines, diallyl amines, and dimethylaminoethylmethacrylate.

21. The method of claim 18 wherein said comonomer comprises sodium polyacrylate.

22. The method of claim 19 wherein said comonomer comprises dimethylaminoethylmethacrylate.

23. A method of rapidly dissolving particles of a water soluble polymer in water, said polymer being selected from the group consisting of biologically produced polymers and polyethylene oxides, said method comprising the steps of:
   (a) contacting said particles with water to form a suspension of said particles in water; and,
   (b) simultaneously with or immediately after formation of said suspension subjecting said suspension to instantaneous and momentary conditions of high shear in order to finely divide said particles, said shear conditions and the proportion of said water to said polymer in said suspension being selected to avoid molecular degradation of said polymer, whereby at least a Portion of said particles are dissolved in said water.

24. The method of claim 23 wherein said polymer comprises between about 0.05 weight percent and 6 weight percent, inclusive, of the total weight of said water and said polymer.

25. The method of claim 23 wherein step (b) is carried out in a particle size reduction apparatus comprising a rotatable impeller and a cylindrical array of generally radially directed blade members circumferentially surrounding said impeller, with radial discharge spaces defined between adjacent blades.

26. The method of claim 25 wherein said discharge spaces are of substantially uniform width.

27. The method of claim 26 wherein said blades and said impeller are offset from each other by an angle of about 2°.

28. The method of claim 23 wherein said suspension is formed prior to step (b).

29. The method of claim 28 wherein said suspension is formed by contacting dry particles of said polymer with a stream of water in mixing means communicating with a particle size reduction apparatus.

30. The method of claim 29 wherein said mixing means comprises a source of polymer particles, a source of water, means for defining a stream of said water, and means for delivering said particles to said stream for mixing thereof.

31. The method of claim 23 wherein said polymer comprises a biologically produced polymer.

32. The method of claim 31 wherein said polymer comprises Xanthan gum.

33. The method of claim 23 wherein said polymer comprises a polyethylene oxide.

* * * * *

UNITED STATES PATENT AND TRADEMARK OFFICE
CERTIFICATE OF CORRECTION

PATENT NO. : 4,529,794

DATED : July 16, 1985

INVENTOR(S) : Edwin T. Sortwell et al

It is certified that error appears in the above-identified patent and that said Letters Patent is hereby corrected as shown below:

In the Table appearing at column 8, lines 4-15, correct the RPM value for Polymer 4 by deleting "6" and substituting --60-- therefor.

Signed and Sealed this

Nineteenth Day of November 1985

[SEAL]

Attest:

Attesting Officer

DONALD J. QUIGG

Commissioner of Patents and Trademarks